United States Patent
Noma et al.

(10) Patent No.: US 7,564,648 B2
(45) Date of Patent: Jul. 21, 2009

(54) MAGNETIC FILM FOR MAGNETIC DEVICE

(75) Inventors: Kenji Noma, Kawasaki (JP); Masaaki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 450 days.

(21) Appl. No.: 10/989,478

(22) Filed: Nov. 16, 2004

(65) Prior Publication Data

US 2005/0271901 A1 Dec. 8, 2005

(30) Foreign Application Priority Data

Jun. 7, 2004 (JP) .............................. 2004-168502

(51) Int. Cl.
*G11B 5/127* (2006.01)
*G11B 5/851* (2006.01)

(52) U.S. Cl. ............................. 360/125.02; 360/125.08; 360/125.45; 428/812; 428/815

(58) Field of Classification Search ........................ None
See application file for complete search history.

(56) References Cited

U.S. PATENT DOCUMENTS

| | | | |
|---|---|---|---|
| 4,891,278 A | | 1/1990 | Otomo et al. |
| 5,939,186 A | * | 8/1999 | Tokutake et al. ............. 428/332 |
| 6,159,593 A | * | 12/2000 | Iwasaki et al. ............ 428/811.2 |
| 6,636,398 B2 | * | 10/2003 | Sasaki et al. ........... 360/324.12 |
| 7,038,873 B2 | * | 5/2006 | Shimazaki et al. ............. 360/59 |
| 7,125,615 B2 | * | 10/2006 | Okawa et al. ................ 428/828 |
| 2002/0131205 A1 | | 9/2002 | Gotoh et al. |
| 2002/0150790 A1 | | 10/2002 | Ikeda et al. |
| 2003/0029520 A1 | | 2/2003 | Ingvarsson et al. |
| 2003/0147176 A1 | | 8/2003 | Gotoh et al. |
| 2003/0184921 A1 | | 10/2003 | Sugita et al. |
| 2003/0209295 A1 | | 11/2003 | Cooper et al. |
| 2003/0228490 A1 | | 12/2003 | Kim |
| 2005/0135020 A1 | * | 6/2005 | Sugita et al. ................. 360/324 |
| 2006/0083950 A1 | * | 4/2006 | Noma et al. ................. 428/812 |
| 2006/0093862 A1 | | 5/2006 | Parkin |

FOREIGN PATENT DOCUMENTS

| EP | 1 605 475 | 12/2005 |
|---|---|---|
| GB | 2 312 088 | 10/1997 |

(Continued)

OTHER PUBLICATIONS

JPO Abstract Translation of JP 05-029172-A (PAT-NO: JP405029172A).*

(Continued)

*Primary Examiner*—Kevin M. Bernatz
(74) *Attorney, Agent, or Firm*—Greer, Burns & Crain, Ltd.

(57) ABSTRACT

The magnetic film of a magnetic device can be practically used and can have saturation magnetization greater than 2.45 T. The magnetic film is an alloy film consisting of iron, cobalt and palladium. Molar content of palladium is 1-7%, and the alloy film is formed by a spattering method. Another magnetic film comprises a ferromagnetic film, and a palladium film or an alloy film including palladium, which are alternately layered. Thickness of the palladium film or the alloy film including palladium is 0.05-0.28 nm, and the layered films are formed by a spattering method or a evaporation method.

11 Claims, 4 Drawing Sheets

FOREIGN PATENT DOCUMENTS

JP    04-186707      7/1992
JP    05029172 A  *  2/1993

OTHER PUBLICATIONS

Derwent Abstract Translation of WO 02-088765-A1 (Derwent-ACC-NO: 2003-148297).*

Noma, K., Matsuoka, M., Kanai, H., Uehara, Y., Nomura, K., and Awaji, N., IEEE Trans. MAg., v41(10), Oct. 2005, 2920-2922.*

Noma, K., Matsuoka, M., Kanai, H., and Uehara, Y., Mag. Conference, Apr. 4, 2005, pp. 781-782.*

Noma, K. et al.; "Enhancement of Magnetic Flux Density in Sputtered FeCoPd alloy and [FeCo/Pd]n Superlattice Films at Room Temperature"; Magnetics Conference; Apr. 4, 2005; pp. 781-782.

Cowen et al.; "Brillouin Light Scattering Studies of Iron-Cobalt Multilayers"; Journal of Magnetism and Magnetic Materials; vol. 165, No. 1-3; Jan. 1997; pp. 383-386.

Komuro et al.; "Epitaxial growth and magnetic properties of $Fe_{16}N_2$ films with high saturation magnetic flux density (invited)"; Journal of Applied Physics, vol. 67, No. 9, pp. 5126-5130; 1990.

Takahashi et al.; "Structure and magnetic moment of $\alpha''$-$Fe_{16}N_2$ compound films: Effect of Co and H on phase formation (invited)"; Journal of Applied Physics, vol. 79, No. 8, pp. 5546-5569; 1996.

Clogston et al.; "Local magnetic moment associated with an iron atom dissolved in various transition metal alloys"; Physical Review, vol. 123, No. 2; pp. 541-552; 1962.

Li et al.; "Magnetic properties of Fe/Pd multilayers grown by electron-beam evaporation"; J. Appl. Phys. vol. 77, No. 8, pp. 3965-3970; 1995.

Sung-Chul Shin; "Magnetic and magneto-optical properties of $Fe_xCo_{1-x}$/Pd" IEEE Trans on Mag., vol. 28, No. 5; pp. 2766-2768; 1992.

Guzman et al.; "Morphologic and magnetic properties of $Pd_{100-x}Fe_x$ nanoparticles prepared by ultrasound assisted electrodchemistry"; J. Appl. Phys., vol. 92, No. 5; pp. 2634-2640; Sep. 1, 2002.

* cited by examiner

MAGNETIC FILM FOR MAGNETIC DEVICE

BACKGROUND OF THE INVENTION

The present invention relates to a magnetic film for a magnetic device, which has a high saturation magnetization property, and a magnetic head for a hard disk drive unit and a solid device, each of which has the magnetic film of the present invention.

To improve recording density of a hard disk drive unit, intensity of a magnetic field, which is generated by a recording head, must be greater. In a conventional recording head, magnetic poles (cores) are made of a ferromagnetic material, and an electric current passes through coils winding around the magnetic poles so as to generate induction magnetic fields and converge the induction magnetic fields in the magnetic poles, so that a strong magnetic field for writing can be emitted in one direction.

If intensity of the induction fields, which are generated by the coils, are fixed, saturation magnetization of the magnetic poles are increased or the induction fields are efficiently converged so as to increase the intensity of the magnetic field for writing.

To increase the intensity of the magnetic field for writing, high saturation magnetization materials have been employed. They are a Ni—Fe alloy (permalloy), a Fe—Al—Si alloy (Sendust), a Fe—Co—Si—B amorphous alloy, a CO—Ni—Fe alloy, a Co—Fe alloy, etc.

When a recording head for a hard disk drive unit was firstly provided for a practical use, an Ni—Zn ferrite was used as a material for magnetic poles. At that time, only magnetic tapes were used as magnetic recording media. The Ni—Zn ferrite has high abrasion resistance and corrosion resistance, further has high resistivity so that eddy current loss can be prevented. However, the Ni—Zn ferrite has a disadvantage of small saturation magnetization, e.g., 0.4 T, as a material for magnetic poles.

At that time, magnetic poles were made by mechanical machining, but it was difficult to machine magnetic poles for small heads. To solve the problem, permalloy, etc., to which photolithography can be applied, are employed. Permalloy is a soft magnetic material invented in 19th century, it has relatively high corrosion resistance and its saturation magnetization is greater than that of ferrite, so that permalloy was used as a material for magnetic poles as well as ferrite. However, the saturation magnetization of permalloy is 1.0 T, so magnetic fields of permalloy poles are insufficient. Thus, high saturation magnetization materials are used these days.

Now a $Fe_{70}Co_{30}$ alloy is mainly employed as a material for magnetic poles. Its saturation magnetization is 2.45 T, which is the greatest as a simple substance. There are no substances having saturation magnetization greater than that of the $Fe_{70}CO_{30}$ alloy. Note that, data of a $Fe_{16}N_2$ film having saturation magnetization of 2.8-3.0 T was reported (see M. Komuro et al., Journal of Applied Physics, vol. 67, No. 9, pp. 5126(1990)). But, the data are now doubted, it seems to be 2.4 T or less (see M. Takahashi et al., Journal of Applied Physics, vol. 79, No. 8, pp. 5546(1996)). Namely, the saturation magnetization of $Fe_{16}N2$ is smaller than 2.45 T of the $Fe_{70}CO_{30}$ alloy.

Experiment data of magnetic films similar to the magnetic film of the present invention were reported. In the experiment, saturation magnetization moment for one atom of Fe or FeCo was increased to 10 μm at the most in a dilute alloy in which Fe was dispersed in Pd, a Fe/Pd multilayered film and a FeCo/Pd multilayered film. Note that, saturation magnetization moment for one atom of Fe is 2.2 μm; that of $Fe_{70}CO_{30}$ is 2.46 μm. The phenomenon was caused by increasing saturation magnetization moment in a boundary surfaces between Fe atoms and Pd atoms. However, according to the data, if the film is entirely made of the Fe—Pd alloy (or the Fe—Co—Pd alloy), content ratio of Pd is much greater than that of Fe, so the saturation magnetization of the entire film must be very small. Therefore, the film cannot be practically used as a material of magnetic poles. In any films, high saturation magnetization were observed around vaporization temperature of liquid helium, i.e., around 2.4K; saturation magnetization moment was not increased at room temperature. The above described data are disclosed in Physical Review, vol. 125, No. 2, pp. 541 (1962); Journal of Applied Physics, vol. 77, No. 8, pp. 3965 (1995); IEEE Transaction on Magnetism, vol. 28, No. 5, pp. 2766 (1992); and Journal of Applied Physics, vol. 92, No. 5, pp. 2634 (2002).

To improve recording density of a hard disk drive unit, it is effective to use a high saturation magnetization material for a recording head. However, as described above, the material having the greatest saturation magnetization is the $Fe_{70}CO_{30}$ alloy, whose saturation magnetization is 2.45T. There are no materials having the saturation magnetization greater than 2.45T.

SUMMARY OF THE INVENTION

The inventors of the present invention have studied compositions of Fe—CO—Pd films and film structures of Fe—Co/Pd multilayered films so as to invent a magnetic film having the saturation magnetization greater than 2.45T.

An object of the present invention is to provide a magnetic film for a magnetic device, which can be practically used and whose saturation magnetization is greater than 2.45T.

Another object is to provide a magnetic head for a hard disk drive unit and a solid device, which use the magnetic film.

To achieve the objects, the present invention has following structures.

Namely, a first structure of the magnetic film is an alloy film consisting of iron, cobalt and palladium, wherein molar content of palladium is 1-7%, and the alloy film is formed by a spattering method.

In the first basic structure, an alloy, which consists of iron, cobalt and palladium and in which the molar content of palladium is 1-7%, may be used as a target in the spattering method. With this structure, the molar content of palladium in the alloy film can be correctly adjusted, so that the magnetic film having the saturation magnetization (Bs) greater than 2.45 T can be provided.

A second basic structure of the magnetic film comprises a ferromagnetic film, and a palladium film or an alloy film including palladium, which are alternately layered, wherein thickness of the palladium film or the alloy film including palladium is 0.05-0.28 nm, and the layered films are formed by a spattering method or a evaporation method.

In the second basic structure, at least two ferromagnetic films may be layered.

In the second basic structure, the ferromagnetic film may be made of iron-cobalt or an alloy including iron-cobalt, and ratio of molar quantity of iron to molar quantity of cobalt (CFe/CCo) may be 0.667-9.0.

Further, in the second basic structure, thickness of the ferromagnetic film may be 2.3 nm or less. With this structure, the magnetic film having the saturation magnetization greater than 2.45 T can be provided.

The magnetic head for a hard disk drive unit of the present invention comprises the magnetic film of the first or second basic structure. And, a solid device of the present invention comprises the magnetic film of the first or second basic structure.

In the magnetic film of the present invention, the saturation magnetization of the film can be greater than that of the conventional $Fe_{70}Co_{30}$ alloy, whose saturation magnetization is 2.45 T at the most. By using the magnetic film for a magnetic head of a hard disk drive unit or a solid device, the hard disk drive unit or the solid device, which is capable of recording data with high recording density, can be provided.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Preferred embodiments of the present invention will now be described in detail with reference to the accompanying drawings. The embodiments are the magnetic film for a magnetic device, the magnetic head for a hard disk drive unit and a solid device having the magnetic film.

Figure 1:
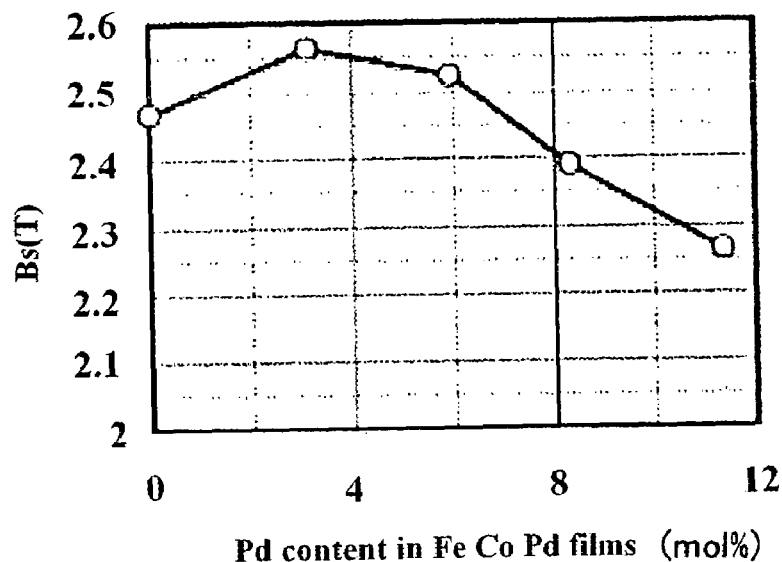
FIG. 1 is a graph showing a relationship between amount of Pd added to $Fe_{70}Co_{30}$ alloys and saturation magnetization of spattered films.

Firstly, a relationship between amount of Pd added to $Fe_{70}Co_{30}$ alloys and saturation magnetization of spattered magnetic films will be explained with reference to FIG. 1. In the experiment, a plurality of targets made of $Fe_{70}Co_{30}$ alloy, to each of which Pd was added, were prepared. Amount of Pd included in the targets were different. The spattering was performed under the conditions of 1000 W and 0.4 Pa. Thickness of the spattered films were 50 nm. Measured saturation magnetization (Bs) of the spattered films are shown in FIG. 1. Note that, the spattered film(s) will be sometimes called "first magnetic film(s)". According to FIG. 1, the saturation magnetization (Bs) of the spattered film including no Pd is 2.45T. On the other hand, the saturation magnetization (Bs) of the spattered film including 3% of Pd is 2.55T. Note that, the saturation magnetization (Bs) of the spattered film including 7% of Pd or more is less than 2.45T.

According to the experiments, a preferable amount of Pd is less than 7% so as to make the saturation magnetization (Bs) of the spattered film, which is formed with the target made of the $Fe_{70}Co_{30}$ alloy including Pd, more than 2.45. Further, the amount of Pd should be 1% or more so as to precisely control composition of Pd.

Compositions of the first magnetic films were quite different from that of the conventional magnetic film in which Fe is dispersed in Pd. Therefore, the increase of the saturation magnetization (Bs) of the FeCoPd films of the experiment is not caused by only increase of saturation magnetization moment μB, which occurs in the dilute alloy in which Fe is dispersed in Pd. The inventors suppose that Pd permutates lattice points or invades between lattices, so that crystal lattices of FeCo are widened. By widening the crystal lattices, an electronic state is changed, so that the saturation magnetization increases in the first magnetic films.

Conventionally, magnetic films for recording heads of hard disk drive units are formed by a spattering method or a plating method. The suitable method for forming the first magnetic films is the spattering method. By properly adjusting the composition of the target or a basic material, molar content of palladium in the film can be easily adjusted in a range of 1-7%. If the target made of a iron-cobalt-palladium alloy, in which the molar content of palladium is a predetermined value, is previously prepared, composition of palladium in the spattered film is defined by composition of palladium in the target. Therefore, the molar content can be correctly controlled. Further, the molar content of palladium in the spattered film does not vary during the spattering method.

Note that, the plating method has been used since permalloy was used as magnetic poles. However, the plating method is not suitable for the FeCoPd films of the present invention. Thickness of films for magnetic poles are several nm to several hundred nm, but composition easily varies at an initial and a final stages of plating the FeCoPd film. The reason is that the ionization tendency is Fe>Co>>Pd>Au>Pt, so Pd precipitates earlier when the FeCoPd alloy is made, so that ratio of Pd ions to Fe and Co ions in plating solution is varied at the initial and the final stages. To prevent the variation of the composition, an additive, e.g., saccharine, is added to the plating solution, but the saturation magnetization of the plated film must be lowered. To gain the saturation magnetization greater than 2.45 T, the molar content of Pd must be severely controlled, but the plating method is not suitable for such severe control.

Figure 2:
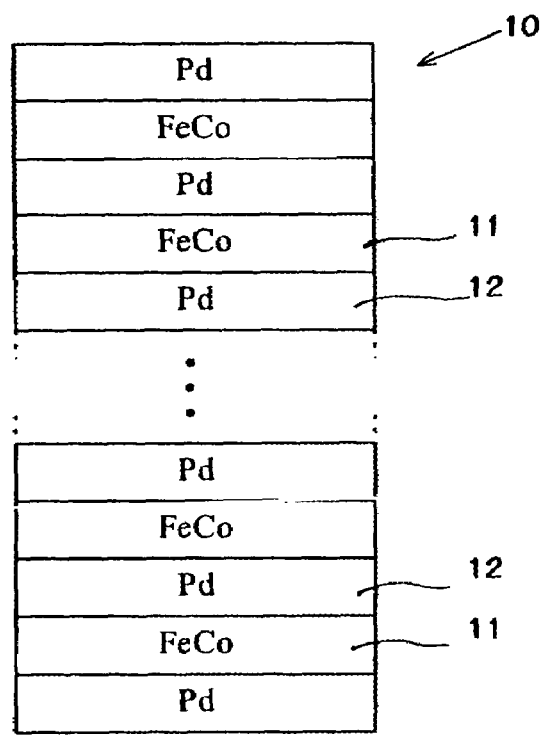
FIG. 2 is an explanation view of a layered structure of a magnetic film for a magnetic device.

Another magnetic film of the present invention is shown in FIG. 2. Hereinafter, this magnetic film 10 is called "second magnetic film". Iron-cobalt ferromagnetic films 11 and palladium films 12 are alternately layered in the magnetic film 10 for a magnetic device.

Figure 3:
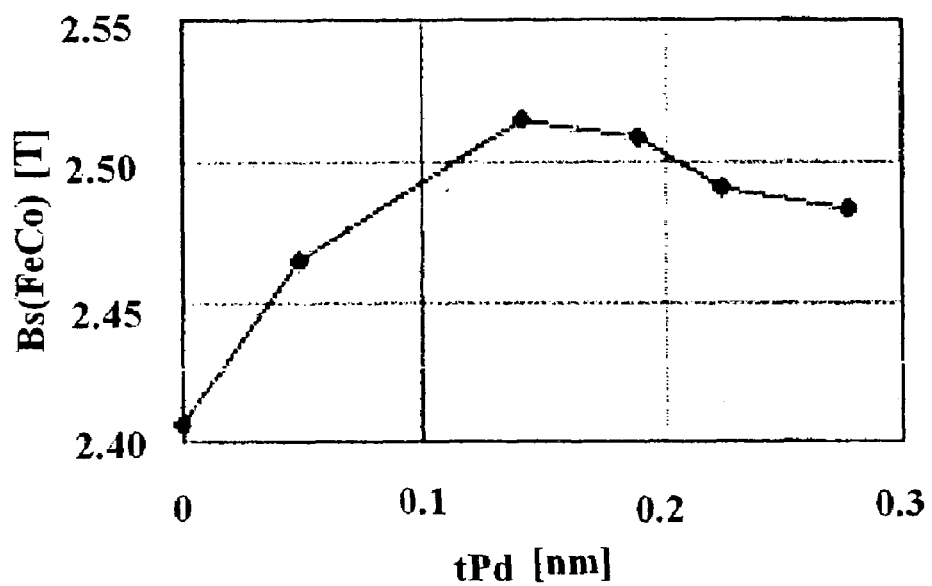
FIG. 3 is a graph showing a relationship between thickness of palladium films and saturation magnetization of multilayered films, in each of which ferromagnetic films and the palladium films are alternately layered.

FIG. 3 is a graph showing a relationship between thickness of the palladium films 12 and saturation magnetization (Bs) of the magnetic films 10, in each of which 25 ferromagnetic films 11 and 25 palladium films 12 were alternately layered. According to the graph, the saturation magnetization (Bs) exceeded 2.45 T when the thickness of the palladium films 12 was 0.05-0.28 nm. In the experiment of FIG. 3, 25 ferromagnetic films 11 and 25 palladium films 12 were alternately layered. Further, experiments were performed. Namely, the saturation magnetization (Bs) of the magnetic films 10, in each of which 10 ferromagnetic films 11 and 10 palladium films 12 were alternately layered, and another magnetic films 10, in each of which 50 ferromagnetic films 11 and 50 palladium films 12 were alternately layered, were measured. In experiments, results were similar to FIG. 3. Namely, in the second magnetic films, in which the ferromagnetic films 11 and 10 palladium films 12 were alternately layered, number of layers did not influence the saturation magnetization; the thickness of the palladium films 12 influences the saturation magnetization.

To increase the saturation magnetization of the second magnetic film (the layered film), ratio of molar quantity of iron to molar quantity of cobalt (CFe/CCo) is 0.667-9.0.

Figure 4:
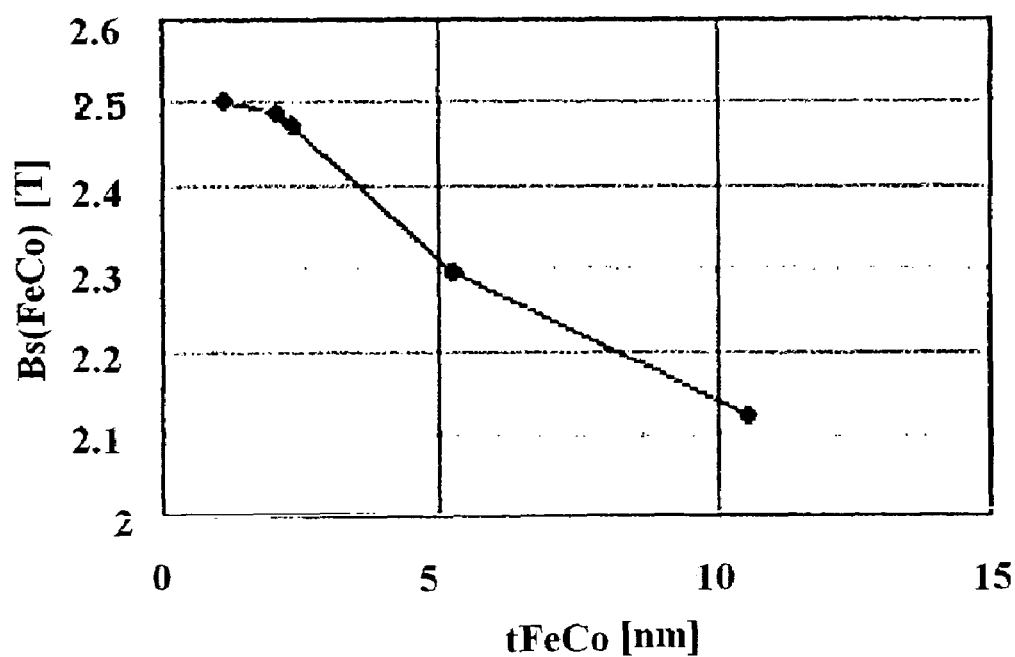
FIG. 4 is a graph showing a relationship between thickness of the ferromagnetic films and saturation magnetization of the multilayered films, in each of which the ferromagnetic films and the palladium films are alternately layered.

FIG. 4 shows a relationship between thickness of the ferromagnetic films 11 and the saturation magnetization (Bs) of the magnetic films 10, in each of which the ferromagnetic films 11 and the palladium films 12 were alternately layered. According to the graph of FIG. 4, the saturation magnetization (Bs) exceeded 2.45 T when the thickness of the ferromagnetic films 11 was 1.0-2.3 nm.

Note that, in the second magnetic film 10, alloy films including palladium may be used instead of the palladium films 12. The alloys including palladium are MoPd, RhPd, etc. In the magnetic film in which the FeCo films and the alloy films are alternately layered, the great saturation magnetization can be gained when thickness of the alloy films including palladium is 0.05-0.28 nm.

Note that, a suitable method of forming the second magnetic film is a spattering method or an evaporation method (MBE method). By the methods, the very thin palladium or alloy films, whose thickness is 0.05-0.28 μm, and the very thin ferromagnetic films, whose thickness is 2.3 nm or less, can be repeatedly formed with high accuracy.

In the layered magnetic film of the present invention, boundary surfaces between the palladium films (or the alloy films including palladium) and the ferromagnetic films must be sharp or steep. The spattering method and the evaporation method are suitable for forming such boundary surfaces.

On the other hand, the plating method is a wet method, and growing speeds of films are fast. Therefore, the plating method is unsuitable for repeatedly forming the very thin films. Especially, when plating solution is changed for changing materials of films, a metal which have already precipitated as a film will be dissolved in the plating solution again, so that mixed layers, which must not be formed, are formed in the boundary surfaces. By forming the mixed layers, the increase of the saturation magnetization must be small.

The saturation magnetization of the magnetic films of the above described embodiments are great, so they can be suitably applied to magnetic heads of hard disk drive units, solid devices, etc.

Figure 5:
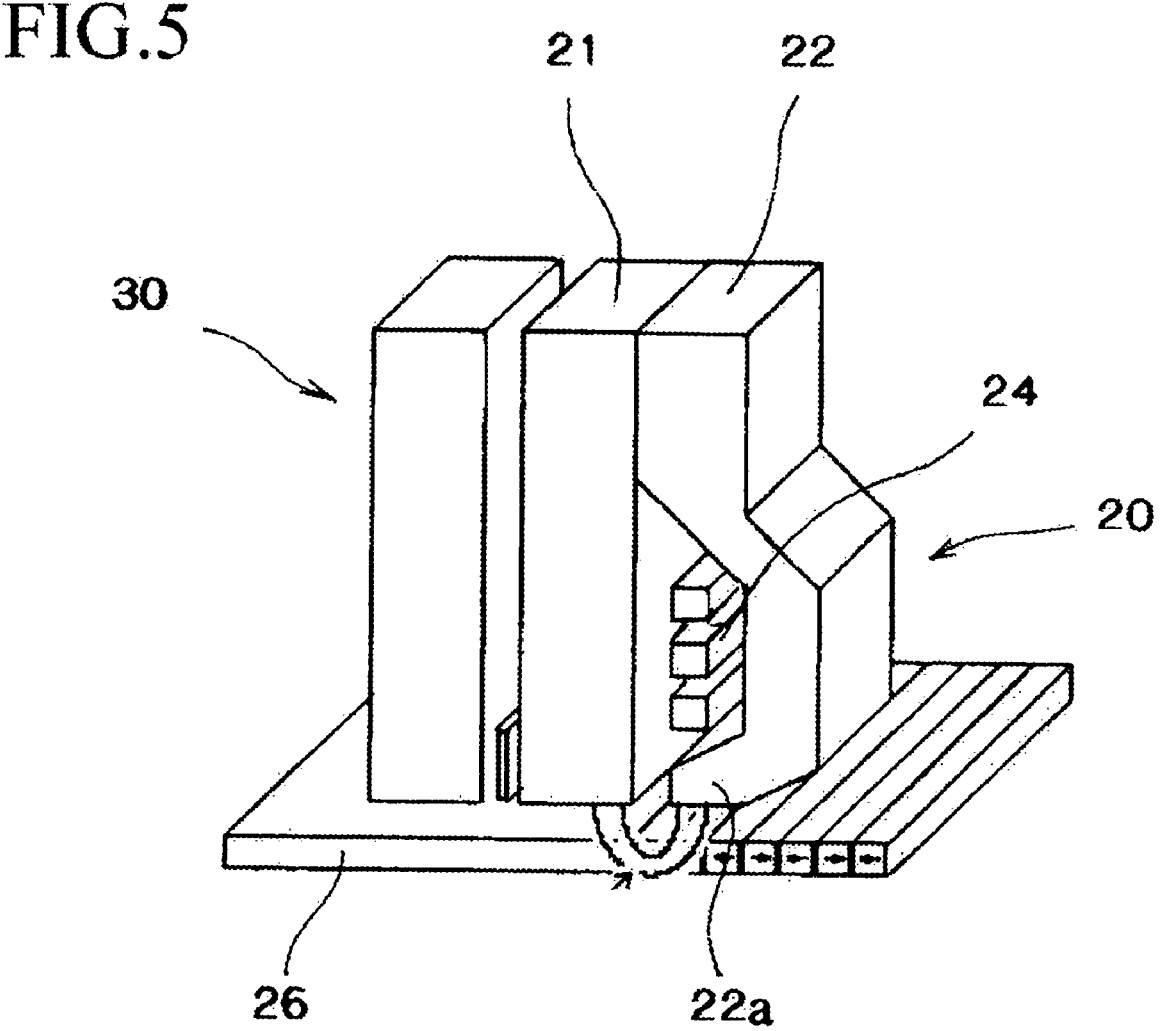
FIG. 5 is an explanation view of a magnetic head having the magnetic film.

FIG. 5 shows a magnetic head of a hard disk drive unit. The magnetic head 30 is used for longitudinal magnetic recording. A recording head section 20 has a lower magnetic pole 21, an upper magnetic pole 22, and a coil 24 interlinking with a core section 22a.

The saturation magnetization of the magnetic film of the present invention is 2.45 T or more, which is greater than that of the $Fe_{70}Co_{30}$ alloy mainly used as a material of magnetic cores. By using the magnetic film in the lower magnetic pole 21, intensity of a magnetic field for writing can be effectively increased, so that recording density of a recording medium 26 can be improved.

When the multilayered magnetic film of the present invention is used in the lower magnetic pole 21, thickness of the lower magnetic pole 21 may be adjusted by adjusting number of piling the ferromagnetic films 11 and the palladium films 12 (or the alloy films including palladium).

The magnetic film of the present invention can be applied to not only the lower magnetic pole 21 of the magnetic head 30 but also the upper magnetic pole 22 thereof. Further, the first magnetic films, which are formed by the spattering method and which consists of the $Fe_{70}CO_{30}$ alloy to which Pd, whose molar content is 1-7%, is added, may be used in the magnetic poles 21 and 22. In this case too, the first magnetic films have the great saturation magnetization greater than 2.45 T, so the recording density of the recording medium 26 can be highly improved.

Figure 6:
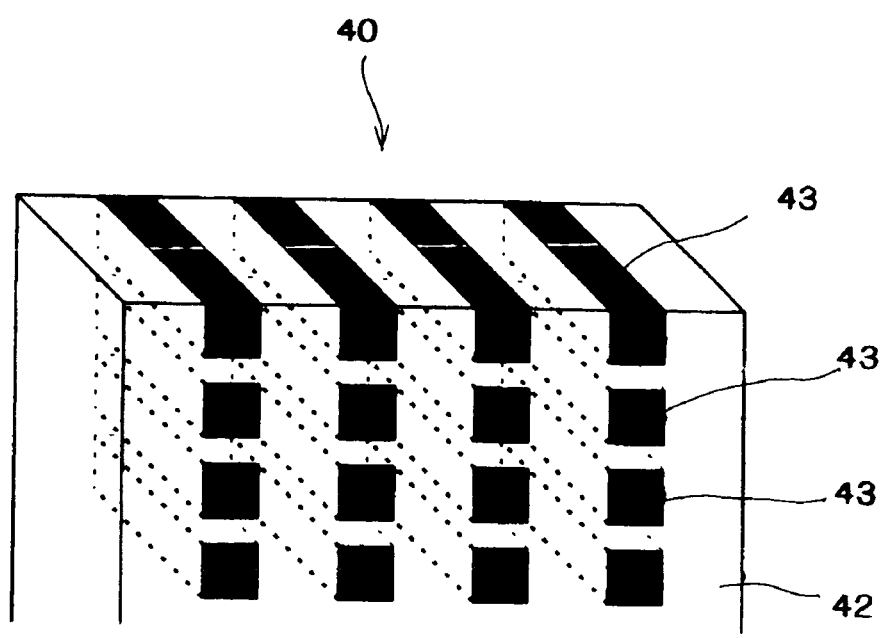
FIG. 6 is an explanation view of a solid device.
Figure 7:
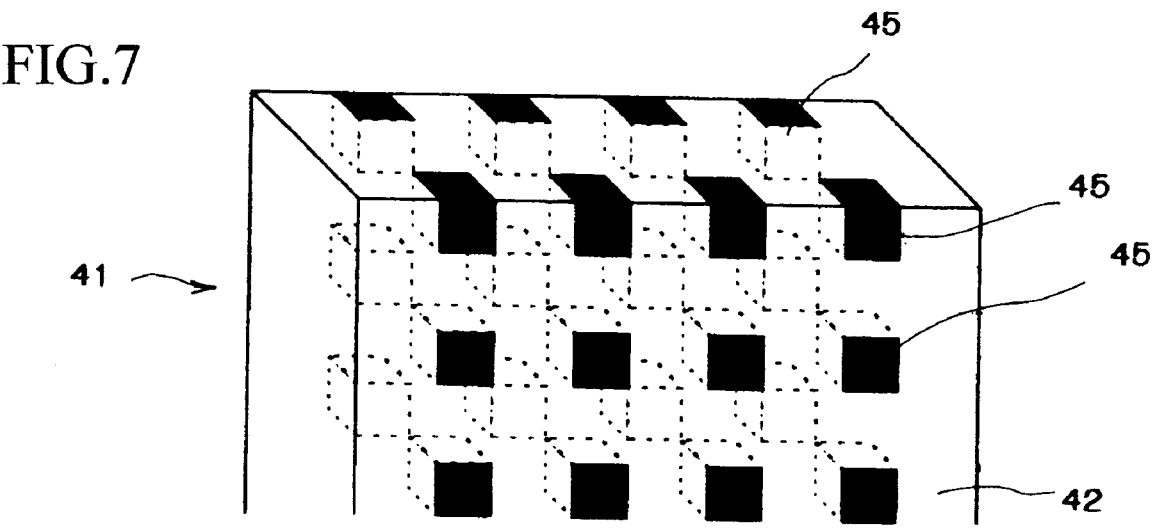
FIG. 7 is an explanation view of another solid device.

FIGS. 6 and 7 show solid devices, which include the magnetic films of the present invention. FIG. 6 shows the solid device 40, in which fine quantum lines 43, which are made of iron-cobalt, are arranged, with regular separations, in a base 42 made of palladium. FIG. 7 shows the solid device 42, in which quantum dots 45, which are made of iron-cobalt, are arranged, with regular separations, in the base 42 made of palladium. The solid devices 40 and 41 may be manufactured by alternately forming palladium layers and iron-cobalt ferromagnetic layers. The layers may be formed by the spattering method or the evaporation method with masks.

The solid devices 40 and 41 shown in FIGS. 6 and 7 may be used as magnetic recording devices. Their layered structures are similar to the structure of the multilayered magnetic film of the present invention. Namely, the solid devices 40 and 41 have great saturation magnetization, so that they can effectively record data with high density. Especially, the solid device 41 having the dot structure is capable of increasing the saturation magnetization per unit volume.

Note that, the inventors further experimented the multilayered magnetic films by piling the FeCoPd films and the Pd alloy films. The maximum saturation magnetization of the FeCoPd film was 2.9T. This value is greater than all of values ever reported.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetic film for a magnetic device,
   comprising a ferromagnetic film, wherein said ferromagnetic film is made of iron-cobalt or an alloy including iron-cobalt, and a palladium film or an alloy film including palladium, which are alternately layered,
   wherein thickness of said palladium film or said alloy film including palladium is 0.05-0.28 nm,
   there is no diffusion between said ferromagnetic film and palladium film, and
   said layered films are formed by a sputtering method or an evaporation method.

2. The magnetic film according to claim 1,
   wherein at least two ferromagnetic films are layered.

3. The magnetic film according to claim 1,
   wherein thickness of said ferromagnetic film is 2.3 nm or less.

4. The magnetic film according to claim 1, wherein said magnetic film has at least two ferromagnetic films and said palladium film or said alloy film including palladium is between the ferromagnetic films.

5. The magnetic film according to claim 1,
   wherein the ratio of molar quantity of iron to molar quantity of cobalt ($C_{Fe}/C_{Co}$) is 0.667-9.0 in said ferromagnetic film.

6. A magnetic head for a hard disk drive unit,
   comprising a magnetic film for a magnetic device,
   wherein said magnetic film comprises a ferromagnetic film, wherein said ferromagnetic film is made of iron-cobalt or an alloy including iron-cobalt, and a palladium film or an alloy film including palladium, which are alternately layered,
   thickness of said palladium film or said alloy film including palladium is 0.05-0.28 nm, there is no diffusion between said ferromagnetic film and palladium film, and said layered films are formed by a sputtering method or an evaporation method.

7. The magnetic head for a hard disk drive unit according to claim 6, wherein said magnetic film has at least two ferromagnetic films and said palladium film or said alloy film including palladium is between the ferromagnetic films.

8. The magnetic head for a hard disk drive unit according to claim 6, wherein the ratio of molar quantity of iron to molar quantity of cobalt ($C_{Fe}/C_{Co}$) is 0.667-9.0 in said ferromagnetic film.

9. A solid device, comprising a magnetic film for a magnetic device, wherein said magnetic film comprises a ferromagnetic film, wherein said ferromagnetic film is made of iron-cobalt or an alloy including iron-cobalt, and a palladium film or an alloy film including palladium, which are alternately layered, thickness of said palladium film or said alloy film including palladium is 0.05-0.28 nm, there is no diffusion between said ferromagnetic film and palladium film, and said layered films are formed by a sputtering method or an evaporation method.

10. The solid device according to claim 9, wherein said magnetic film has at least two ferromagnetic films and said palladium film or said alloy film including palladium is between the ferromagnetic films.

11. The solid device according to claim 9, wherein the ratio of molar quantity of iron to molar quantity of cobalt ($C_{Fe}/C_{Co}$) is 0.667-9.0 in said ferromagnetic film.

\* \* \* \* \*

UNITED STATES PATENT AND TRADEMARK OFFICE
CERTIFICATE OF CORRECTION

PATENT NO. : 7,564,648 B2  Page 1 of 1
APPLICATION NO. : 10/989478
DATED : July 21, 2009
INVENTOR(S) : Noma et al.

It is certified that error appears in the above-identified patent and that said Letters Patent is hereby corrected as shown below:

In the Claims:

Col. 6, Line 43    Delete "sputtering" and insert --spattering-- in its place.
Claim 1

Col. 7, Line 3     Delete "sputtering" and insert --spattering-- in its place.
Claim 6

Col. 8, Line 8     Delete "sputtering" and insert --spattering-- in its place.
Claim 9

Signed and Sealed this

Twenty-fourth Day of November, 2009

David J. Kappos
*Director of the United States Patent and Trademark Office*